(12) United States Patent
Tietze

(10) Patent No.: US 6,811,015 B2
(45) Date of Patent: Nov. 2, 2004

(54) SYSTEM HAVING A MOTOR VEHICLE GEARBOX AND METHOD OF USING SAME

(75) Inventor: Frank Tietze, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/314,437

(22) Filed: Dec. 9, 2002

(65) Prior Publication Data

US 2003/0116399 A1 Jun. 26, 2003

(30) Foreign Application Priority Data

Dec. 8, 2001 (DE) .......................... 101 60 478

(51) Int. Cl.[7] .............................................. B60K 41/20
(52) U.S. Cl. ...................... 192/219; 192/218; 477/126; 477/92; 303/171
(58) Field of Search ................................ 192/218, 219, 192/221, 222; 477/126, 92; 303/171, 173, 182

(56) References Cited

U.S. PATENT DOCUMENTS

| 3,437,184 | A | * | 4/1969 | Wilson | 192/218 |
|---|---|---|---|---|---|
| 3,458,018 | A | * | 7/1969 | Shore | 192/221 |
| 3,540,556 | A | * | 11/1970 | Snoy et al. | 192/221 |
| 3,858,696 | A | * | 1/1975 | Shore | 192/221 |
| 3,910,389 | A | | 10/1975 | Pleier | 192/4 |
| 3,913,700 | A | * | 10/1975 | James | 192/219 |
| 4,248,330 | A | | 2/1981 | Audiffred, Jr. et al. | 192/4 |
| 4,300,652 | A | * | 11/1981 | Redzinski et al. | 192/222 |
| 4,386,688 | A | | 6/1983 | Sato et al. | 192/0.033 |
| 4,724,726 | A | * | 2/1988 | Knecht | 475/119 |
| 4,768,636 | A | * | 9/1988 | Ito et al. | 192/222 |
| 5,588,515 | A | * | 12/1996 | Toyama et al. | 192/222 |
| 6,413,189 | B1 | | 7/2002 | Spiess et al. | 477/110 |

FOREIGN PATENT DOCUMENTS

| DE | 25 14 306 | 10/1975 |
|---|---|---|
| DE | 30 38 400 | 4/1981 |
| DE | 198 30 953 | 3/2000 |

\* cited by examiner

Primary Examiner—Roger Pang
Assistant Examiner—Eric M. Williams
(74) Attorney, Agent, or Firm—Crowell & Moring LLP

(57) ABSTRACT

A system for a motor vehicle has a motor vehicle gearbox by means of which a reversal of the direction of travel can be initiated, a vehicle brake unit which is separate from the motor vehicle gearbox, and a control unit. When there is a reversal of the direction of travel from at least one first direction into a second direction when there is still a positive vehicle velocity in the first direction, the control unit generates a braking torque which reduces the vehicle velocity, by means of an actuation unit and by means of the vehicle brake unit. The actual direction of travel of the motor vehicle is determined here by means of a sensor unit.

13 Claims, 2 Drawing Sheets

SYSTEM HAVING A MOTOR VEHICLE GEARBOX AND METHOD OF USING SAME

BACKGROUND AND SUMMARY OF THE INVENTION

This application claims the priority of Application No. 101 60 478.5-51, filed Dec. 8, 2001, in Germany, the disclosure of which is expressly incorporated by reference herein.

The invention relates to a system having a motor vehicle gearbox, which can facilitate reversal of the travel direction.

German Patent Document DE 198 30 953 A1 (corresponding U.S. Pat. No. 6,413,189) has already disclosed a system having a motor vehicle gearbox by means of which a reversal of the direction of travel of a motor vehicle can be initiated using a reversing mechanism. In addition, the system has a control unit for automatically reversing the direction of travel, it being possible for a person to select a reversal from forward travel to reverse travel or from reverse travel to forward travel by means of the control unit.

The control unit is constructed in such a way that after the selection of a reversal of the direction of travel by a person at a vehicle velocity above a specific limiting velocity, the vehicle velocity is automatically reduced by decreasing a transmission ratio of the infinitely variable motor vehicle gearbox under infinitely variable control.

In addition, the system has a vehicle brake unit which is separate from the motor vehicle gearbox and by means of which a person can increase the deceleration process of the motor vehicle.

U.S. Pat. No. 4,248,330 discloses a tractor for slow velocities at which the vehicle brakes are activated as soon as the driver of the vehicle switches over between forward travel and reverse travel. Here, the vehicle brake system and the gearbox is supplied with hydraulic fluid or pressure from one and the same pressure medium pump. When the gear speed is changed, the pressure in the brake system drops owing to the pressure spaces of the gearbox clutches being filled with hydraulic fluid. The vehicle brake of the tractor is spring-loaded so that the drop in pressure in the gearbox owing to the above-mentioned change of gear speed causes the tractor to be braked.

German DE 25 14 306 A1 (corresponding U.S. Pat. No. 3,910,389) discloses a load-lifting vehicle or tractor shovel which is braked during a gearbox shifting operation between the directions of the vehicle. The flow means of a pressure medium pump is directed here to a brake system and an anti-direction-reversal valve.

German DE 30 38 400 A1 (corresponding U.S. Pat. No. 4,386,688) discloses an automatic deceleration device for use by tracklaying vehicles in which an automatic deceleration takes place without the brake pedal and the deceleration pedal being depressed. If a vehicle velocity is predefined and the actual velocity is higher, automatic deceleration takes place and the gearbox is then shifted into a suitable position.

An object of the invention is to provide a system with a particularly wide area of application which additionally permits the drive train to be loaded as little as possible. This object is achieved according to certain preferred embodiments of the invention by providing a system for a motor vehicle having a motor vehicle gearbox by means of which a reversal of the direction of travel can be initiated, having a vehicle brake unit which is separate from the motor vehicle gearbox, and having a control unit wherein, when there is a reversal of the direction of travel from at least a first direction into a second direction when there is still a positive vehicle velocity (v) in the first direction, the control unit generates a braking torque (M) which reduces the vehicle velocity (v) by means of an actuator unit and by means of the vehicle brake unit, the direction of travel being sensed by means of a sensor unit.

The invention is based on a system for a motor vehicle having a motor vehicle gearbox by means of which a reversal of the direction of travel can be initiated, having a vehicle brake unit which is separate from the motor vehicle gearbox, and having a control unit.

It is proposed that, when there is a reversal of the direction of travel from at least a first direction into a second direction when there is still a positive vehicle velocity in the first direction, the control unit generates a braking torque which reduces the vehicle velocity, by means of an actuating unit and by means of the vehicle brake unit. The actual direction of travel is sensed here by means of a sensor unit which can be configured in particular as a rotational speed sensor on a wheel of the motor vehicle and by means of which the direction of rotation of the wheel can also be sensed. Consequently, the motor vehicle has to be braked only if it does not in any case already roll in the direction of travel selected as the objective—i.e. the second direction—when the neutral setting N is inevitably passed. Likewise, if the vehicle already rolls in the direction of travel which is desired as the objective of the reversal of the direction of travel, the program sequence for braking the wheels can be modified. Consequently, depending on which direction of travel is sensed by the sensor unit, procedures for braking the vehicle which are different from the main program are processed in a controller of the vehicle brake unit. These different procedures can in particular result in different braking torques over the velocity. The system can basically be used in all motor vehicles with infinitely variable or incremental, partially automatic or fully automatic motor vehicle gearboxes, and in particular unnecessarily high loading of the motor vehicle gearbox and of the entire drive train can be avoided, specifically by using a brake unit which is separate from the vehicle gearbox. In addition, with the solution according to the invention, a braking torque of virtually any desired magnitude can be generated independently of a selected setting of the motor vehicle gearbox, specifically in particular even in a neutral setting of the motor vehicle gearbox.

The actuator unit which is assigned to the vehicle brake unit can be formed by an actuator which is already present, for example by an actuator of an electronic stabilization program (ESP) and/or particularly advantageously by an actuator for generating a complete braking pressure, which is actuated electrically by means of a pedal in the motor vehicle, as a result of which additional actuating means can be avoided. However, it is also contemplated for one or more actuators to be additionally provided for the system.

As a result of the refinement of a vehicle brake unit which is separate from the motor vehicle gearbox, it is possible, in a particularly advantageous way, to use different actuator systems for the motor vehicle gearbox and the separate vehicle brake unit, that is to say both the gearbox and the vehicle brake unit can be actuated hydraulically, electrically or pneumatically. Here, the actuator systems can differ from one another so that, for example, the gearbox is actuated electrically, whereas the vehicle brake unit is an electrohydraulic system. In the case of gear-shifting operations from the forward travel gear speed D to the reverse travel gear speed R and vice versa when using a hydraulic gearbox, the separation advantageously results in the brake pressure not being directly dependent on the pressure drop owing to the filling of the pressure spaces of the gearbox clutches with hydraulic fluid. This separation also entails efficiency advantages as it is necessary to maintain a brake system pressure of 150 bar for an electrohydraulic brake system whereas a customary automatic gearbox requires only a working pressure of 25 bar.

If the control unit initiates at least one switching-over process in the motor vehicle gearbox only starting from a defined vehicle velocity, it is also possible to avoid unnecessary high loading, and in addition savings in terms of locking mechanisms can be achieved, or at least the function of locking mechanisms can be supported.

In a further refinement of the invention, it is proposed that the control unit be formed at least partially by a controller for the motor vehicle gearbox and by a controller for the vehicle brake unit. Existing components can be advantageously used and there can be a reduction in terms of additional components, installation space, weight, expenditure on assembly and costs.

If the control unit sets, as a function of at least one operating parameter, the magnitude of the braking torque generated by means of the actuator unit and the vehicle brake unit, for example along one or more functions in accordance with one of more characteristic diagrams, a braking process which is particularly advantageously adapted to the peripheral conditions and a reversal of the direction of travel which is advantageously adapted to the peripheral conditions can be achieved. The process can be made dependent on various operating parameters which appear appropriate to a person skilled in the art, for example as a function of a currently sensed or permanently stored motor vehicle weight, as a function of prevailing carriageway conditions, positive gradient of the carriageway and in particular as a function of a sensed vehicle velocity.

The necessary information can be sensed by means of specially provided sensors or advantageously read out of a data network of the motor vehicle, for example by means of a CAN (Controller Area Network) bus, as a result of which already existing sensors can at least largely be used.

In addition, a jolting movement of the motor vehicle can advantageously be avoided or a uniform movement obtained, thus increasing comfort, if, at the start of a reversal of the direction of travel, the control unit generates a braking torque which rises along a function, and/or at the end of a reversal of the direction of travel generates a braking torque which decreases along a function.

Further advantages emerge from the following description of the drawing. The drawing illustrate an exemplary embodiment of the invention. The description and the claims contain numerous features in combination. A person skilled in the art will advantageously also consider the features individually and combine them to form further appropriate combinations.

DETAILED DESCRIPTIONS OF THE DRAWINGS

Figure 1:
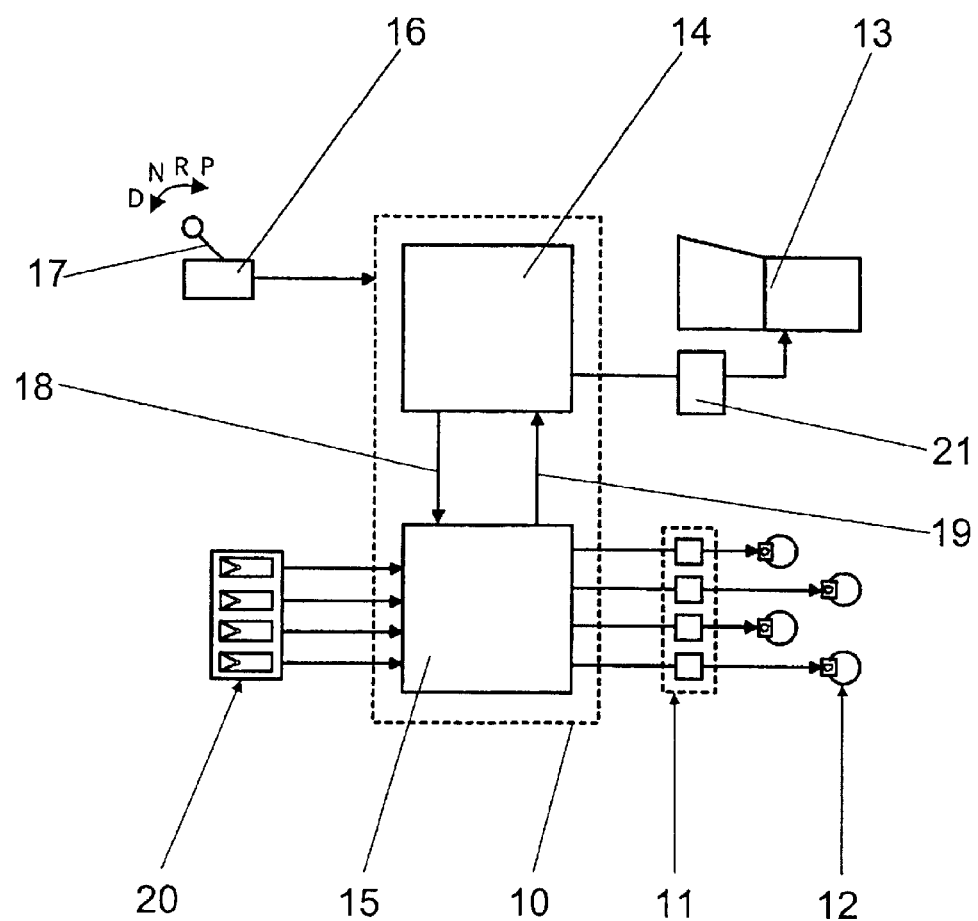
FIG. 1 shows a schematic view of a system according to the invention.

FIG. 1 shows a system according to the invention for a motor vehicle (not illustrated in more detail) with a multi-step reduction automatic gearbox 13 which has a reversing gear mechanism for a reversal of the direction of travel and can be actuated by means of an actuation unit 16 with a selector and a shift lever 17. The selector and shift lever 17 has successive settings P-R-N-D (park, reverse, neutral, drive). In addition, the system has a vehicle brake unit 12 which is separate from the multi-step reduction automatic gearbox 13 and has four disc brakes, each assigned to a wheel of the motor vehicle, and a control unit 10. Here, both the multi-step reduction automatic gearbox 13 and the vehicle brake unit 12 which is separate from it have a separate pump. The working pressure of the multi-step reduction automatic gearbox 13 which is 25 bar at maximum can be brought about with the pump of the multi-step reduction automatic gearbox 13. The multi-step reduction automatic gearbox 13 requires this pressure in order, inter alia, to fill the pressure spaces of the shift clutches in order to shift the individual gear speeds and place them under pressure. The pump of the separate vehicle brake unit 12 is embodied as an electric pump. The brake system pressure is applied using this electric pump. This brake system pressure is distributed among the four wheels as required by means of four modulators. A store keeps the brake fluid at a pressure of 140 bar here.

According to the invention, when there is a reversal of the direction of travel from reverse travel into forward travel and from forward travel into reverse travel when there is a still positive vehicle velocity v in the original direction, the control unit 10 generates, by means of an actuator unit 10 11 and by means of the vehicle brake unit 12, a braking torque M which reduces the vehicle velocity v. The control unit 10 is formed by a controller 14 of the multi-step reduction automatic gearbox 13 and by a controller 15 of the vehicle brake unit 12 which are connected to one another via data lines 18, 19.

If a negative vehicle velocity v is determined when there is a reversal of the direction of travel from reverse travel into forward travel and from forward travel into reverse travel with respect to the original direction, special procedures which take into account the fact that the motor vehicle is already rolling in the desired direction when the brake is engaged are processed in the controller 15. This situation occurs, for example, if, when the shift lever 17 is shifted from the reverse travel position R the vehicle is already rolling forward owing to a negative gradient when the neutral setting N is passed, and the shift lever 17 is moved further into the forward travel setting D by the driver of the vehicle. In order to compare the desired direction of travel with the actual direction of travel, the signal of a sensor unit 20 is sensed, said sensor unit 20 having a rotational speed sensor which is mounted on at least one of the wheels of the vehicle.

If the vehicle is stationary, i.e. the vehicle velocity v is equal to zero, the vehicle is also braked after the shift lever 17 has been repositioned.

Figure 2:
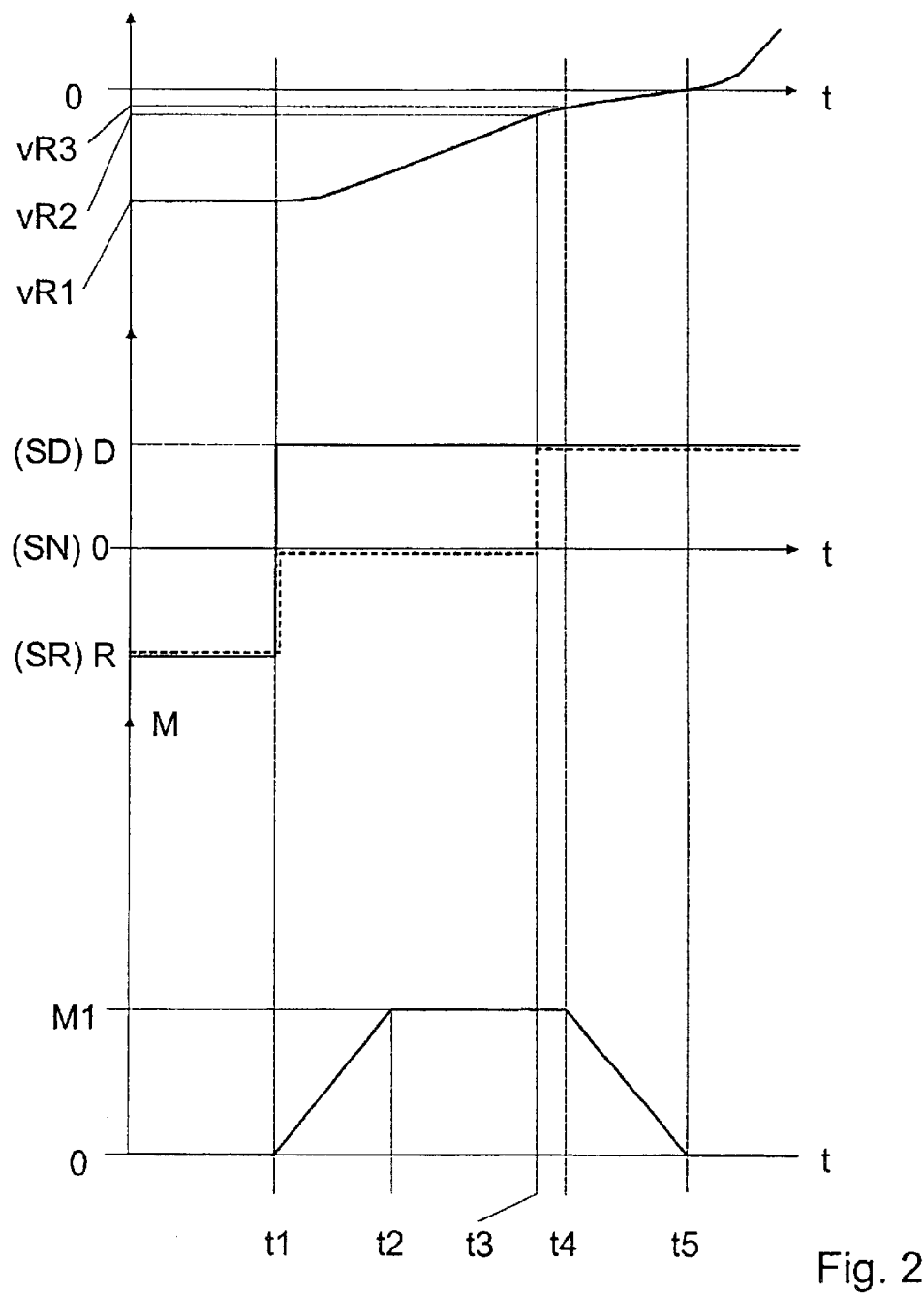
FIG. 2 shows flowcharts during a reversal of the direction of travel.

FIG. 2 shows flowcharts of a reversal of the direction of travel from reverse travel to forward travel, a velocity profile of the motor vehicle being illustrated in the top diagram, the settings R, D of the selector and shift lever 17 being illustrated in the second diagram and settings SR, SN, SD of a shift element (not illustrated in more detail) in the multi-step reduction automatic gearbox 13, and the third diagram illustrating a braking torque profile of the vehicle brake unit 12 plotted against time t.

The selector and shift lever 17 is moved into a forward travel setting D from a reverse travel setting R at the time t1, the change of setting being communicated to the controller 14 of the multi-step reduction automatic gearbox 13 by the actuation unit 16. At the time t1, the motor vehicle moves backwards with a vehicle velocity vR1. The vehicle velocity vR1 and the direction of travel are sensed here by means of a sensor unit 20 which has a rotational speed sensor on one wheel of the motor vehicle. It would also be possible to determine the direction of travel from the original setting R or D. The vehicle velocity vR is transmitted from the sensor unit 20 to the controller 15 of the vehicle brake unit 12, and the setting of the selector and shift lever 17 is transmitted by the controller 14 of the multi-step reduction automatic gearbox 13 to the controller 15 of the vehicle brake unit 12, which generates, by means of the actuator unit 11 and the vehicle brake unit 12, a braking torque M which reduces the vehicle velocity vR. At the start of the reversal of the direction of travel, specifically in a time period t1 to t2, the controller 15 of the vehicle brake unit 12 generates a braking torque M which rises linearly along a function over the time t, in order to avoid a jolting movement of the motor vehicle. If a braking torque M1 which is matched to the prevailing vehicle velocity vR is reached, this is kept constant in a time period t2 to t3.

In addition, at the time t1, the controller 14 of the multi-step reduction automatic gearbox 13 uses an actuator 21 to move a shift element (not illustrated in more detail) in the multi-step reduction automatic gearbox 13 from its reverse travel setting SR into its neutral setting SN. The controller 14 of the multi-step reduction automatic gearbox 13 does not use the actuator 21 to initiate a switch-over process of the shift element from its neutral setting SN into its forward travel setting SV until the vehicle velocity vR1 is reduced to the vehicle velocity vR2 at the time t3 owing to the braking torque M. The current vehicle velocity v is communicated by the controller 15 of the vehicle brake unit 12 to the controller 14 of the multi-step reduction automatic gearbox 13 via the data line 19.

If the vehicle velocity vR2 is reduced further to the vehicle velocity vR3, the controller 15 of the vehicle brake unit 12 generates, at the end of the reversal of the direction of travel, specifically in a time period t4 to t5, a braking torque M which decreases linearly along a function over the time t, in order to avoid a jolting movement of the motor vehicle, the braking torque M and the vehicle velocity v being zero at the time t5. After the time t5, the motor vehicle moves forward.

The reversal of direction of travel can be initiated by means of the selector and shift lever 17 at any desired forward velocity vV and at any desired reverse velocity vR. However, it is also possible that the reversal of the direction of travel using the selector and shift lever 17 can be initiated only starting from a specific vehicle velocity v, and that before then the selector and the shift lever 17 is blocked in this respect by means of a blocking element.

The duration of the time periods t1 to t2, t2 to t3, t3 to t4 and t4 to t5 is also dependent, like the braking torque M1, on the velocity of the vehicle. In a simplified embodiment of the system, the shift element can be engaged in the target setting—i.e. forward travel setting SD or reverse setting SR—directly after the linearly increasing braking to the braking torque M1, after which the braking torque is then reduced. In this case, the time period t2 to t3 of the constant braking torque M1 is ideally reduced to zero.

The braking torque can also have a non-linear profile in each of the time periods t1 to t2, t2 to t3, t3 to t4 or t4 to t5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Reference Symbols

10 Control unit
11 Actuator unit setting
12 Vehicle brake unit
13 Motor vehicle gearbox setting
14 Controller
15 Controller
16 Actuation unit
17 Selector and shift lever
18 Data line
19 Data line
20 Sensor unit
21 Actuator
R Reverse travel
N Neutral setting
D Forward travel
t Time
SR Setting
SD Setting
SN Setting
M Braking torque
V Vehicle velocity

What is claimed is:

1. System for a motor vehicle having a motor vehicle gearbox with which a reversal of the direction of travel can be initiated, having a vehicle brake unit which is separate from the motor vehicle gearbox, and having a control unit, wherein, when there is a reversal of the direction of travel sensed by a sensor unit located at at least one vehicle wheel and having a rotational speed sensor from at least a first direction into a second direction when there is still a positive vehicle velocity (v) in the first direction, sensed by said sensor unit the control unit generating a braking torque (M) which reduces the vehicle velocity (v) with an actuator unit and the vehicle brake unit.

2. System according to claim 1, wherein the control unit initiates a switch-over process in the motor vehicle gearbox only starting from a defined vehicle velocity (vR2).

3. System according to claim 1, wherein the control unit is formed at least partially by a controller for the motor vehicle gearbox and by a controller for the vehicle brake unit.

4. System according to claim 1, wherein the magnitude of the braking torque (M) generated by the actuator unit and the vehicle brake unit is set by the control unit as a function of at least one operating parameter (v, t).

5. System according to claim 4, wherein the control unit sets the braking torque (M) as a function of a sensed vehicle velocity (v).

6. System according to claim 5, wherein at the start of a reversal of the direction of travel, the control unit generates a braking torque (M) which rises along a function in order to avoid a jolting movement of the motor vehicle.

7. System according to claim 6, wherein at the end of a reversal of the direction of travel, the control unit generates a braking torque (M) which decreases along a function in order to avoid a jolting movement of the motor vehicle.

8. Method for controlling a system having a motor vehicle gearbox with which a reversal of the direction of travel can be initiated, and having a vehicle brake unit which is separate from the motor vehicle gearbox, when there is a reversal of the direction of travel sensed by a sensor unit located at at least one vehicle wheel and having a rotational speed sensor from at least a first direction to a second direction when there is still a positive vehicle velocity (v) in the first direction, sensed by said sensor unit braking torque (M) being generated by an actuator unit and the vehicle brake unit, and the execution of the method being dependent on a sensed direction of travel of the motor vehicle.

9. Method according to claim 8, wherein the system includes a control unit operable to initiate a switch-over process in the motor vehicle gearbox only starting from a defined vehicle velocity (vR2).

10. Method according to claim 8, wherein the magnitude of the braking torque (M) generated by the actuator unit and the vehicle brake unit is set by a control unit as a function of at least one operating parameter (v, t).

11. Method according to claim 10, wherein the control unit sets the braking torque (M) as a function of a sensed vehicle velocity (v).

12. Method according to claim 11, wherein at the start of a reversal of the direction of travel, the control unit generates a braking torque (M) which rises along a function in order to avoid a jolting movement of the motor vehicle.

13. Method according to claim 12, wherein at the end of a reversal of the direction of travel, the control unit generates a braking torque (M) which decreases along a function in order to avoid a jolting movement of the motor vehicle.

* * * * *